(No Model.)

A. JOHNSON.
SELF DROPPING AND CHECK ROWING ATTACHMENT TO CORN PLANTERS.

No. 265,964. Patented Oct. 17, 1882.

Witnesses.

Inventor.

UNITED STATES PATENT OFFICE.

AMOS JOHNSON, OF JEFFERSON, IOWA.

SELF-DROPPING AND CHECK-ROWING ATTACHMENT TO CORN-PLANTERS.

SPECIFICATION forming part of Letters Patent No. 265,964, dated October 17, 1882.

Application filed February 13, 1882. (No model.)

*To all whom it may concern:*

Be it known that I, AMOS JOHNSON, of Jefferson, in the county of Greene and State of Iowa, have invented certain new and useful Improvements in Corn-Planting Machines, of which the following is a specification.

This invention relates to automatic mechanism designed for the purpose of operating the feeding or grain-dropping slide of a corn-planter, in order that the seed may be deposited in line with the check-rows.

In the accompanying drawings I have represented the improvement applied to the front portion or runner-frame of an ordinary corn-planting machine, the construction of this frame and the manner of its attachment to the remainder of the machine constituting no part of my invention, similar constructions being familiar to all persons skilled in the art.

Figure 1:
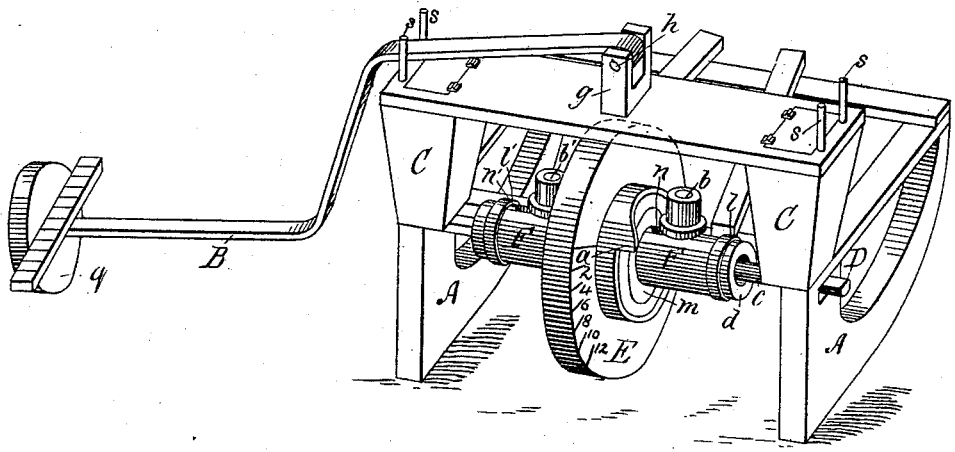
Figure 2:
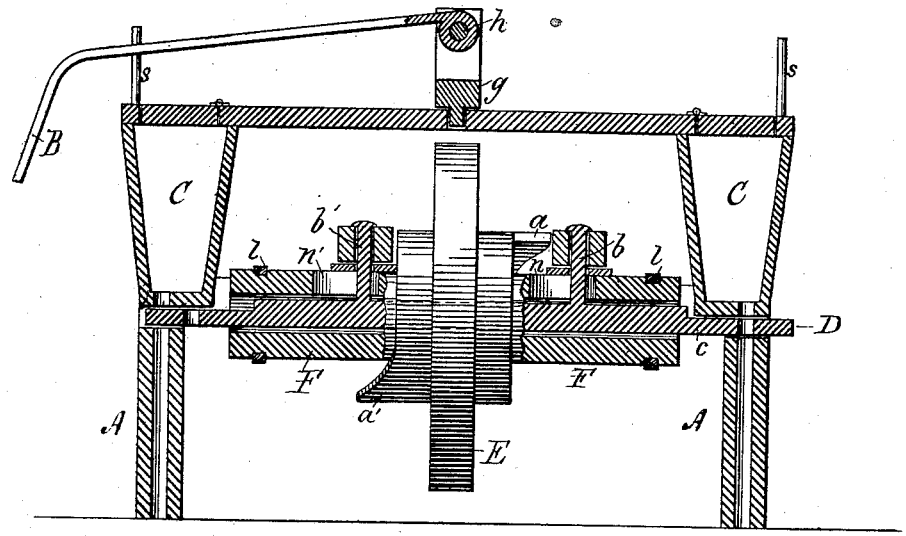

Referring to the accompanying drawings, Figure 1 is a perspective view. Fig. 2 is a vertical cross-section.

A A represent the two runners designed to open a furrow and to carry the seed boxes or hoppers C, from which the corn is delivered through the heels of the runners into the furrow, as usual. The feeding of the corn from the hopper into the runners is effected at suitable intervals by means of a reciprocating feed-slide, D, perforated at its ends and arranged to operate in substantially the ordinary manner, so that at each reciprocation the charge of corn will be delivered from the hopper.

The first part of my invention relates to the means for imparting the reciprocating motion to the slide. I mount in the frame around the feed-slide a tubular axle, F, sustaining the same permanently in position by any suitable connection with the runners or the main frame. In the upper side of the tubular axle I form two longitudinal slots, $m$ and $n'$, through which I extend vertical studs $b$ and $b'$, secured to the feed-slide. Upon the upper ends of the studs I prefer to mount roller or sleeves, as shown, for the purpose of reducing the friction; but the studs may be employed without the rollers.

Loosely around the central axle I mount a wheel, E, designed to run upon and be rotated by contact with the surface of the ground. This wheel is located between the studs $b$ and $b'$, and is provided on opposite sides with circular cams of flanges $a$ and $a'$, designed to act upon the studs for the purpose of moving the slide to and fro. The two cams are arranged as shown in the drawings, with the highest point of one opposite the lowest point of the other, so that as they are rotated with the wheel they will be brought into play alternately. The cam $a$ will first act upon the stud $b$ and move the slide to the right, and after a suitable interval of time has elapsed the cam $a'$ will operate upon the stud $b'$ and move the slide to the left. The wheel is made of such size that its circumference is equal to the distance between two of the check-rows, so that each revolution of the wheel causes the deposition of corn in two rows.

In operating the machine it is driven across the field and then turned, as usual, at the side of the field, and driven across the same in the opposite direction.

In order that the corn may be deposited in or upon the check-rows, it is necessary to provide means by which the operator may determine the point at which the dropping shall occur. I therefore provide the side of the machine with an extended arm or marker, B, carrying at its outer end the wheel $q$, standing in line with the dropping mechanism. This arm is pivoted at the center of the machine by an upright revolving stud, $g$, so that it may be turned to the right or left of the machine, as required, the machine being provided with studs $s$ to retain it in position. The machine in ceasing its motion frequently stops between the rows.

In order that the operator may determine the distance at which the dropping device stopped from the row, I provide the wheel E with a series of peripheral graduations, as shown in Fig. 1, commencing at a point in line with the edge of the operating-cam $a$, and being regularly spaced backward therefrom. These graduations are preferably placed at a distance of two inches apart and extended backward a distance of one foot. At the instant that the dropping occurs the first graduation will stand in line with the top bar of the frame and one or another of the graduations will stand beneath the edge of said bar, according to the distance which the machine has been carried beyond the check-row. The attendant, reading the graduations in connection with this bar, is thus enabled to determine the exact adjustment required after the machine has turned to cause the planting of the corn at the check-lines.

In operating the machine it is customary for the operator to carry a stake or pin, to be inserted in line with the marker Q, when the machine is stopped at the end of the field, thus facilitating the adjustment of the parts to effect the deposit at the proper points.

Having thus described my machine, what I claim is—

1. In a corn-planter, the combination, with the reciprocating slide and the studs thereon, of the fixed tubular axle and the traction-wheel mounted loosely upon said axle and provided on opposite sides with cams to operate the slide, as described and shown.

2. The traction-wheel provided with cam-surfaces on opposite sides, in combination with the reciprocating slide passing centrally through said wheel and arranged to reciprocate under the action of its cams, substantially as described and shown.

AMOS JOHNSON.

Witnesses:
A. F. WHITE,
W. NESBITT.